(12) United States Patent
Syed et al.

(10) Patent No.: US 12,501,266 B2
(45) Date of Patent: Dec. 16, 2025

(54) SYSTEM AND METHOD OF ROUTING FOR LOCATION PRIVACY PRESERVATION IN WIRELESS SENSOR NETWORKS

(71) Applicant: KING FAHD UNIVERSITY OF PETROLEUM AND MINERALS, Dhahran (SA)

(72) Inventors: Naqeebuddin Mujahid Syed, Dhahran (SA); Uthman Baroudi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 142 days.

(21) Appl. No.: 18/431,348

(22) Filed: Feb. 2, 2024

(65) Prior Publication Data
US 2025/0048105 A1    Feb. 6, 2025

Related U.S. Application Data

(60) Provisional application No. 63/517,469, filed on Aug. 3, 2023.

(51) Int. Cl.
*H04W 12/122*    (2021.01)
*H04W 12/02*    (2009.01)
(Continued)

(52) U.S. Cl.
CPC ......... *H04W 12/122* (2021.01); *H04W 12/02* (2013.01); *H04L 63/1441* (2013.01); *H04W 84/18* (2013.01)

(58) Field of Classification Search
CPC ... H04W 12/02; H04W 12/122; H04W 84/18; H04L 63/1441
See application file for complete search history.

(56) References Cited

U.S. PATENT DOCUMENTS

| | | | | |
|---|---|---|---|---|
| 10,492,064 | B1* | 11/2019 | Baroudi | H04W 12/02 |
| 2006/0165100 | A1* | 7/2006 | Huang | H04W 64/00 |
| | | | | 370/328 |

FOREIGN PATENT DOCUMENTS

| | | | | |
|---|---|---|---|---|
| CN | 108551672 A | * | 9/2018 | ............ H04W 12/00 |
| CN | 111431630 A | | 7/2020 | |

(Continued)

OTHER PUBLICATIONS

Ozturk, C., Yanyong Z., and Wade T. (2004). Source-location privacy in energy-constrained sensor network routing. Proceedings of the 2nd ACM workshop on Security of Ad hoc and Sensor Networks. (Year: 2004).*

(Continued)

*Primary Examiner* — Robert B Leung
(74) *Attorney, Agent, or Firm* — Oblon, McClelland, Maier & Neustadt, L.L.P.

(57) ABSTRACT

A wireless sensor network (WSN) and a method of routing in a wireless sensor network (WSN) includes wireless sensor nodes for monitoring an environment and a base station having a WSN manager to which information about the environment is sent from the wireless sensor nodes via multiple hop communication. The method includes responding to an attack on the wireless sensor network by an adversary to locate critical nodes among the wireless sensor nodes by adaptively deploying a sequence of different routing mechanisms, by the WSN manager, to the wireless sensor nodes such that location privacy preservation (LPP) is protected by preventing detection of location of the critical nodes.

17 Claims, 10 Drawing Sheets

400

Respond to an attack on the wireless sensor network by an adversary to locate critical nodes among the wireless sensor nodes by adaptively deploying a sequence of different routing mechanisms, by the wsn manager, to the wireless sensor nodes such that location privacy preservation (lpp) is maximized ⟶ 402

(51) Int. Cl.
*H04W 84/18* (2009.01)
*H04L 9/40* (2022.01)

(56) References Cited

FOREIGN PATENT DOCUMENTS

| CN | 113453143 A | * | 9/2021 | ............ H04W 4/025 |
|---|---|---|---|---|
| CN | 113206784 B | | 4/2022 | |

OTHER PUBLICATIONS

Nezhad, A. A., Miri, A., & Makrakis, D. (2008). Location privacy and anonymity preserving routing for wireless sensor networks. Computer Networks, 52(18), 3433-3452. (Year: 2008).*

Gianini, G. and Damiani, E., Aug. 2008. A game-theoretical approach to data-privacy protection from context-based inference attacks: A location-privacy protection case study. In Workshop on Secure Data Management (pp. 133-150). Berlin, Heidelberg: Springer Berlin Heidelberg. (Year: 2008).*

Freudiger, J., Manshaei, M.H., Hubaux, J.P. and Parkes, D.C., Nov. 2009. On non-cooperative location privacy: a game-theoretic analysis. In Proceedings of the 16th ACM conference on Computer and communications security (pp. 324-337). (Year: 2009).*

Shokri, R., Theodorakopoulos, G. and Troncoso, C., 2016. Privacy games along location traces: A game-theoretic framework for optimizing location privacy. ACM Transactions on Privacy and Security (TOPS), 19(4), pp. 1-31. (Year: 2016).*

Manjula, R., & Datta, R. (2018). A novel source location privacy preservation technique to achieve enhanced privacy and network lifetime in WSNs. Pervasive and Mobile Computing, 44, 58-73. (Year: 2018).*

Han, G., Zhou, L., Wang, H., Zhang, W. and Chan, S., (2018). A source location protection protocol based on dynamic routing in WSNs for the Social Internet of Things. Future Generation Computer Systems, 82, pp. 689-697. (Year: 2018).*

Mutalemwa, L.C. and Shin, S., (2020). Secure routing protocols for source node privacy protection in multi-hop communication wireless networks. Energies, 13(2), p. 292. (Year: 2020).*

Kamat, P., Zhang, Y., Trappe, W., & Ozturk, C. (2005). Enhancing source-location privacy in sensor network routing. In 25th IEEE international conference on distributed computing systems (ICDCS'05) (pp. 599-608). IEEE. (Year: 2005).*

Li, Y., & Ren, J. (Mar. 2010). Source-location privacy through dynamic routing in wireless sensor networks. In 2010 Proceedings IEEE Infocom (pp. 1-9). IEEE. (Year: 2010).*

Berdibek, A., & Saginbekov, S. (Nov. 2019). A routing protocol for source location privacy in wireless sensor networks with multiple sources. In Proceedings of the 15th ACM international symposium on QoS and security for wireless and mobile networks (pp. 93-99). (Year: 2019).*

Kumar, G., Rathore, R. S., Thakur, K., Almadhor, A., Biabani, S. A. A., & Chander, S. (2023). Dynamic routing approach for enhancing source location privacy in wireless sensor networks. Wireless Networks, 29(6), 2591-2607. (Year: 2023).*

Tscha, Y. (2009). Routing for enhancing source-location privacy in wireless sensor networks of multiple assets. Journal of Communications and Networks, 11(6), 589-598. (Year: 2009).*

Ozturk et al. ; Source-Location Privacy in Energy-Constrained Sensor Network Routing ; Conference Paper ; Oct. 2004 ; 7 Pages.

Mutalemwa et al. ; Achieving Source Location Privacy Protection in Monitoring Wireless Sensor Networks through Proxy Node Routing ; MDPI Sensors, 19 ; Feb. 28, 2019 ; 19 Pages.

* cited by examiner

```
                                                              ← 400
                                                             ↙

┌─────────────────────────────────────────────────────────────┐
│ Respond to an attack on the wireless sensor network by an adversary │
│   to locate critical nodes among the wireless sensor nodes by       │
│  adaptively deploying a sequence of different routing mechanisms,   ├── 402
│    by the wsn manager, to the wireless sensor nodes such that       │
│        location privacy preservation (lpp) is maximized             │
└─────────────────────────────────────────────────────────────┘
```

FIG. 4

SYSTEM AND METHOD OF ROUTING FOR LOCATION PRIVACY PRESERVATION IN WIRELESS SENSOR NETWORKS

CROSS-REFERENCE TO RELATED APPLICATIONS

This application claims the benefit of priority to provisional application No. 63/517,469 filed Aug. 3, 2023, the entire contents of which are incorporated herein by reference.

STATEMENT REGARDING PRIOR DISCLOSURE BY THE INVENTORS

Aspects of this technology are described in an article Syed, Mujahid N., and Uthman Baroudi. "Tactile Routing for Location Privacy Preservation in Wireless Sensor Networks: A Game Theoretic Approach" Sensors 22, no. 19:7334. doi.org/10.3390/s22197334 (2022) which is incorporated herein by reference in its entirety.

STATEMENT OF ACKNOWLEDGEMENT

Support provided by the Deanship of Scientific Research (DSR) at King Fahd University of Petroleum & Minerals (KFUPM), Dhahran, Saudi Arabia, is gratefully acknowledged.

BACKGROUND

Technical Field

The present disclosure is directed to a method, system and apparatus to operate a wireless sensor network in a manner that preserves location privacy. The approach is preferably formulated as a two-player zero-sum game with an adversary.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Typically, wireless sensor networks (WSNs) are built from wireless sensor nodes, where each wireless sensor node is connected to one or more sensors for monitoring physical and/or environmental conditions, such as temperature, sound, vibration, pressure, humidity, motion, pollutants, and/or other environmental condition. The WSNs are one of the key elements in the success of Industrial Internet of Things (IIoTs) and smart systems. One of the primary tasks of WSNs is to monitor a given environment using sensor nodes and transmit the information to the base station via multiple hop communication. These networks are typically deployed and operated in unattended environments. In other words, unlike wireless communication devices, e.g., smartphones, wireless sensor nodes are not attended by human users. Therefore, the networks might be vulnerable to intrusion that may compromise the location of critical network nodes (like source(s) and sink(s) nodes). A critical factor in the successful operation of WSNs is the Location Privacy Preservation (LPP) of these critical nodes. LPP seeks to protect against a case in which a WSN has an adversary aiming to unravel the identity and/or location of critical nodes of a WSN.

As an example, consider a Wireless Sensor Network (WSN) where an adversary makes passive attacks to identify (or locate) the critical nodes. The adversary can choose any attack mechanisms including, for example: Eavesdropping, Tracing Back, Traffic Analysis, Node Compromised, ID Analysis, Collusion Stacks. In the example, $m_a$ is the adversary's method, where $a \in A$, and A is the set of attacking mechanisms available with the adversary. It is assumed that the adversary is capable of launching local or hotspot level attacks on the WSN. The goal of WSN manager is to maximize the safety period, while ensuring the Quality of Service (QOS) with reasonable energy consumption. The WSN is designed such that multiple routing mechanisms can adaptively be employed, so the WSN manager (defender) could command the nodes in a WSN to choose among these different routing mechanisms. For example, the WSN manager (defender) could choose any of the following routing mechanisms for certain period and then choose another one for the next period and so on according to a specific defense strategy. Defense strategies can include random walk, ring routing, phantom base station, fake packet injection, multipath routing, data mule, hiding mechanism, directional communication, and isolation mechanism. Consider, for example, if $s_d$ is the defense strategy, where $d \in D$, and D is the set of options available with the defender and $h_{d,a}$ is the total survival time (the time from the start of attacks to the detection of critical station(s)) when the adversary picks an attack mechanism a and the defender picks a defense mechanism d. The primary goal of the defender is to have high survival time, which is contrary to the goal of the adversary. Therefore, the payoff for adversary is with the amount that the defender loses, and can be taken as $h_{d,a}$. In such case, the conflict between adversary and defender can be modeled as a two-player zero sum-game. A two-player zero-sum game is a game in which the sum of the winnings and losses of the various players is always zero. However, unlike the conventional game theory models, the manager has to satisfy the QoS and energy requirements. In addition to that, the data of survival time is uncertain.

Accordingly, it is one object of the present disclosure to provide methods and systems for operating a wireless sensor network in a manner that preserves location privacy and adaptively deploys a sequence of different routing mechanisms, to the wireless sensor nodes such that location privacy preservation (LPP) is maximized.

SUMMARY

In an exemplary embodiment, a method of routing in a wireless sensor network (WSN) is described. The wireless sensor network includes wireless sensor nodes for monitoring an environment and a base station having a WSN manager to which information about the environment is sent from the wireless sensor nodes via multiple hop communication. An attack on the wireless sensor network is responded to by an adversary to locate critical nodes among the wireless sensor nodes by adaptively deploying a sequence of different routing mechanisms, by the WSN manager, to the wireless sensor nodes such that location privacy preservation (LPP) is protected by preventing detection of location of the critical nodes.

In another exemplary embodiment, a wireless sensor network (WSN) is described. The wireless sensor network (WSN) includes wireless sensor nodes, a base station, and a WSN manager. The wireless sensor network (WSN) monitors an environment. The base station to receive an information about the environment via multiple hop communication. The WSN manager configured to respond to an attack on the wireless sensor network by an adversary to locate critical nodes among the wireless sensor nodes, by adaptively deploy a sequence of different routing mechanisms to the wireless sensor nodes such that location privacy preservation (LPP) is protected by preventing detection of location of the critical nodes.

In another exemplary embodiment, a wireless sensor network is described. The wireless sensor network includes Unmanned Aerial Vehicles, a base station and a WSN manager. The Unmanned Aerial Vehicles monitors an environment. The base station receives information about the environment via multiple hop communication. The WSN manager is configured to, given an attack by an adversary, locate critical Unmanned Aerial Vehicles among the Unmanned Aerial Vehicles and adaptively deploy a sequence of different routing mechanisms to the wireless sensor nodes in order to protect location privacy preservation (LPP) by preventing detection of location of the critical Unmanned Aerial Vehicles.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4 is an exemplary flowchart of a method of routing in a wireless sensor network (WSN), according to certain embodiments.

DETAILED DESCRIPTION

Figure 1A:
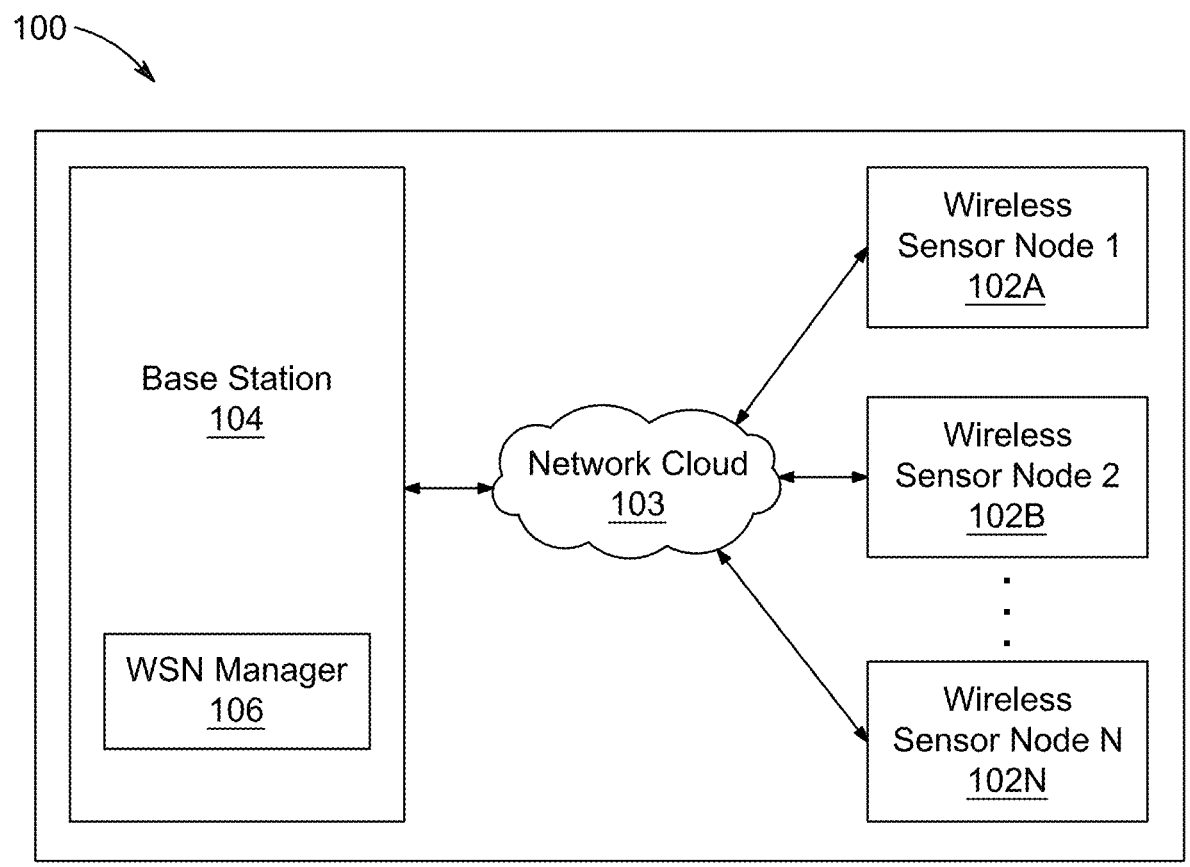
FIG. 1A is a schematic diagram of a wireless sensor network, according to certain embodiments.

In the drawings like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method of routing in a wireless sensor network (WSN). Location Privacy Preservation (LPP) in Wireless Sensor Networks (WSNs) during the era of Internet of things (IoT) and smart systems is a critical element in the success of WSNs. Typical research in LPP of WSN routing involves developing and/or estimating the performance of a fixed routing protocol under a given attack mechanism. Motivated by advancements in network software, in the present disclosure, the WSN manager as well as the WSN adversary can deploy multiple routing and attack mechanisms, respectively. The present disclosure is formulated as a repeated two-player zero-sum game. The formulation is further extended to handle incomplete information in the game matrix. The present disclosure is directed towards improving the routing methods under the assumption that the adversary lacks the ability to decipher the encrypted packets. The conventional research on LPP in WSNs typically assumes a specific intrusion model, and the primary goal is to develop a corresponding routing method that is better in terms of location privacy. In addition to that, the secondary goals may include reduced age of information and energy consumption. One of the naive assumptions in conventional approaches is the prepossession of a specific intrusion model. Since the intrusion can be executed by one or more adversaries, surviving one or more intrusion techniques with one specific routing method may not be fruitful in preserving the location of the critical nodes over the network's time horizon. Motivated by the advent of network software and advancements in Software Defined Network (SDN) and Network Functions Virtualization (NFV), the present disclosure provides a hybrid routing model where the network communications are done via multiple routing methods. The tactile routing model of the present disclosure provides a means to handle multiple intrusions via multiple techniques.

In several contexts, the relation between network designers/administrators and intruders/attackers is modeled as a non-cooperative game. Hence, security and privacy-based protocols in computer networks can be designed using game theory. In game theory-based approaches, a strategic game between the WSN manager (as the defender) and the WSN attacker (as the adversary) is used. The roles of the defender and the adversary, under mild assumptions, can be cast as a two-player zero-sum game. Following are the key assumptions and characteristics of the zero-sum game. Rational players: Both players have well-defined individual goals, and they strive to reach their goals. Non-cooperative players: Both players are competitive and their individual goals are diametrically opposed. Finite moves: Both players have a finite set of moves to play. A move for the defender (adversary) can be defined as a selection of a routing (counterattack) mechanism. Independent moves: Unlike typical two-player games, in this game, there are no fixed time points where the players play their moves. Practically, the players can play the moves asynchronously and at different frequencies. However, the moves are taken independently, that is no player knows the choice of the other player a priori. Memory-less repeated moves: The game is a multiple-shot game, where the moves of the defender are not at all visible to the adversary (and vice versa), even after the end of the game. Thus, it exhibits memory-less nature, where none of the players learn from the other based on the past shots or moves. Expected preference: For every combination of defender move and attacker move, a payoff is known or can be estimated. This payoff captures the preference relation for each player. Both players prefer to get the best of the expected payoff value. Thus, due to the above nature of the game, the game can be approximated as a steady-state two-player zero-sum game. Since the moves are taken by the players over and over again during the network's operation, it is preferred for the defender to use different pure strategies on each move. Therefore, the optimal mixed strategy obtained from the two-player zero-sum game can be utilized as tactical operational probabilities for the defender.

As a basis for the two-player zero-sum game, let $H \in R^{D \times A}$ be a matrix, where the $d^{th}$ row and $a^{th}$ column element $h_{d,a}$ represents the survival time when an adversary picks an attack mechanism $a \in A$ and a defender picks a defense mechanism $d \in D$. Let us assume that $h_{d,a}$ are crisp and deterministic. The expected payoff E of the game, gain for the defender (loss for the adversary) is given as follows:

$$E = x^T H y \quad (1)$$

where $x=[x_1, \ldots, x_{|D|}]^T$, $x_d$ is the probability of using the strategy d by the defender, and $y=[y_1, \ldots, y_{|A|}]^T$, $y_\alpha$ is the probability of using the strategy $\alpha$ by the adversary. In the case of mixed strategies, the objective of defender is to maximize the minimum expected payoff. Whereas the objective of the adversary is to minimize the maximum expected payoff.

Lemma-1: The Operations Research (OR) model to identify best mixed strategy for the defender (a.k.a max-minimizer) can be written as:

$$\max_{x \geq 0} \min_{a \in A} \{h_a^T x \mid e^T x = 1\} \quad (2)$$

where $h_a$ is the $a^{th}$ column of matrix H, e represents a vector containing all ones, and its size can be identified from the context.

Proof-1: Let $E_d(x)$ be the worst expected payoff value of the defender for any arbitrary choice of x, defined as:

$$E_d(x) = \min_{e^T y=1, y \geq 0} \{x^T H y\} \quad (3)$$

The worse expected value can be re-written as:

$$E_d(x) = \min_{e^T y=1, y \geq 0} \{x^T H y\} \quad (4a)$$

$$= \min_{e^T y=1, y \geq 0} \left\{ \sum_{a \in A} (H^T x)_a y_a \right\} \quad (4b)$$

$$= \min_{a \in A} \{(H^T x)_a\} \quad (4c)$$

$$= \min_{a \in A} \{h_a^T x\} \quad (4d)$$

where $(H^T x)_\alpha$ is the $\alpha^{th}$ element of vector $H^T x$. Equation (4c) follows from the theory of linear programming, which states that the optimal solution of a linear function $\Sigma_{\alpha \in A}$ $(H^T x)_{\alpha} y_\alpha$ on a non-empty simplex $\{e^T y=1, y \geq 0\}$ lies at one of the $|A|$ extreme points. Thus, the OR model that provides best mixed strategy for the defender (a.k.a max-minimizer) can be written as:

$$\max_{e^T x=1, x \geq 0} \min_{a \in A} \{h_a^T x\} \quad (5)$$

The above formulation is same as Formula (2).

Corollary-1: The OR model to identify best mixed strategy for the attacker can be written as:

$$\min_{y \geq 0} \max_{d \in D} \{h_d^T y \mid e^T y = 1\} \quad (6)$$

where $h_d$ is the $d^{th}$ row of matrix H.

Lemma-2: The proposed game has mixed strategy Nash equilibrium.

Proof-2: Based on the linear programming's weak duality theory, the following holds:

$$\min_{a \in A} \{h_a^T x \mid e^T x = 1, x \geq 0\} \leq \max_{d \in D} \{h_d^T y \mid e^T y = 1, y \geq 0\} \quad (7)$$

It can be observed that both Equations (2) & (6) are feasible. From the linear programming's strong duality theory, it can be concluded that the optimal objective values for both formulations are equal and finite, say v. The following holds:

$$\max_{x \geq 0} \min_{a \in A} \{h_a^T x \mid e^T x = 1\} = \min_{y \geq 0} \max_{d \in D} \{h_d^T y \mid e^T y = 1\} = v \quad (8)$$

Let x* and y* be defined as follows:

$$x^* = \operatorname{argmax}_{x \geq 0} \left\{ \min_{a \in A} \{h_a^T x \mid e^T x = 1\} \right\} \quad (9)$$

$$y^* = \operatorname{argmin}_{y \geq 0} \left\{ \max_{d \in D} \{h_d^T y \mid e^T y = 1\} \right\} \quad (10)$$

Equation (8) indicates that, no matter what the adversary (defender) chooses to play, the defender (adversary) has no rational to change from x*(y*). That is, neither can hope to improve the expected payoff value of $x^{*T} H y^*$. Thus, (x*, y*) represents mixed strategy Nash equilibrium of the game.

In a practical application, the defender (adversary) may have additional objectives that are unrelated to the adversary (defender). For example, the defender might be inclined to deviate from the optimal mixed strategy in order to reduce energy consumption and/or improve QoS in communication. Formulation (2) can be extrapolated to include the QoS and energy objectives. Incorporation of the additional objectives for the defender's model may invalidate the above minimax equality. However, the resulting strategy will ensure that QoS and energy consumption in the communication network are at preferred level. A Multi-Objective Linear Programming (MOLP) model that captures optimal mixed strategy for the defender can be written as:

max:

$$\{\lambda, -q^T x, -p^T x\} \quad (11a)$$

s.t.:

$$\lambda \le h_a^T x \quad a \in A \quad (11b)$$

$$e^T x = 1 \quad (11c)$$

$$x \ge 0 \quad (11d)$$

where the QoS level expressed in terms of the transmission latency, obtained by strategy d is represented by $q_d$ for all $d \in D$, and $q=[q_1, \ldots, q_{|D|}]^T$. Similarly, the energy consumption for strategy d is represented by $p_d$ for all $d \in D$, and $p=[p_1, \ldots, p_{|D|}]^T$. Constraints (11c) and (11d) ensure that x results in the probability of selecting the defense strategy. Constraint (11b) along with the first objective in Function (11a) maximizes the worse case survival time. The other two objective functions correspond to transmission latency and energy minimization.

Let $p_{max}=p^T x^*$ and $q_{max}=q^T x^*$. Formulation (11) can be equivalently solved as series of the following OR models, where $\varepsilon_1$ and $\varepsilon_2$ are parameters that are selected apriori:

max:

$$\lambda \quad (12a)$$

s.t.:

$$:\lambda \le h_a^T x \quad a \in A \quad (12b)$$

$$e^T x = 1 \quad (12c)$$

$$q^T x \le q_{max} - \varepsilon_1 \quad (12d)$$

$$p^T x \le p_{max} - \varepsilon_2 \quad (12e)$$

$$x \ge 0 \quad (12f)$$

When $\varepsilon_1 = \varepsilon_2 = 0$, the solution of Formulation (12) results in minimax game value. However, when $\varepsilon_1 \ne 0$ or $\varepsilon_2 \ne 0$, then the solution deviates from the minimax game value. Obtaining the solution for various values of $\varepsilon_1$ and $\varepsilon_2$ results in a Pareto surface, which can be presented to the WSN manager. The network manager and decision makers can then select the operational point from the Pareto. A Pareto Surface may be defined as a Pareto front or set of optimal solutions in the space of objective functions in multi-objective optimization problems (MOOPs) which stands for a set of solutions that are non-dominated to each other but are superior to the rest of solutions in the search space.

In the following subsection, the model is extended to handle uncertainty in the H matrix.

Uncertainly in the H matrix is typically referred to as incomplete information in payoffs. Uncertain payoffs in the form of interval-valued payoffs are related to the WSN game. In the present disclosure, it is assumed that the uncertainty in estimating parameter H exists. Furthermore, it is assumed that the uncertainty can be represented by a bounded interval. Without loss of generality, the interval based payoff matrix of the defender is expressed as $\Omega=(\omega)_{d,\alpha}=([\underline{h}_{d,\alpha}, \overline{h}_{d,\alpha}])$, where $(\omega)_{d,\alpha}$ is a closed interval, $\underline{h}_{d,\alpha}$ is the lower bound on the closed interval, and $\overline{h}_{d,\alpha}$ is the upper bound of the closed interval.

Note that the above uncertainty keeps the zero-sum nature of the game intact, since the payoff matrix of the attacker will be nothing but $-\Omega=(-\omega)_{d,\alpha}=([-\overline{h}_{d,\alpha}, -\underline{h}_{d,\alpha}])$. Similar to the methodology presented in for handling interval-based uncertainty, Formulation (12) is transformed into two formulations: one for obtaining lower bound (pessimistic game) and another for obtaining upper bound (optimistic game). The formulations are as follows:

max:

$$\overline{\lambda} \quad (13a)$$

s.t.:

$$\overline{\lambda} \le \overline{h}_a^T \overline{x} \quad a = 1, \ldots, A \quad (13b)$$

$$e^T \overline{x} = 1 \quad (13c)$$

$$q^T \overline{x} \le \overline{q}_{max} - \varepsilon_1 \quad (13d)$$

$$p^T \overline{x} \le \overline{p}_{max} - \varepsilon_2 \quad (13e)$$

$$\overline{x} \ge 0 \quad (13f)$$

$$\underline{\lambda} \le \underline{h}_a^T \underline{x} \quad a = 1, \ldots, A \quad (14b)$$

$$e^T \underline{x} = 1 \quad (14c)$$

$$q^T \underline{x} \le \underline{q}_{max} - \varepsilon_1 \quad (14d)$$

$$p^T \underline{x} \le \underline{p}_{max} - \varepsilon_2 \quad (14e)$$

$$\underline{x} \ge 0 \quad (14f)$$

where the values of $(\overline{q}_{max}, \overline{p}_{max})$ and $(\underline{q}_{max}, \underline{p}_{max})$ are obtained using (9) by replacing $h_\alpha^T$ with, $\overline{h}_a$ and $\underline{h}_a$ respectively. Solving Formulations (13) and (14) results in the upper bound $\overline{\lambda}$ and the lower bound $\underline{\lambda}$, respectively for a given value of $\varepsilon_1$ and $\varepsilon_2$.

Table 1 below illustrates a survival time payoffs for the defender 2×2 game.

|    | TA          | TB               |
|----|-------------|------------------|
| PR | Long [45]   | Medium [3, 12, 46] |
| MR | Medium [23] | Long [47]        |

Table 2 below illustrates energy (p) and latency (q) for each routing mechanism of the 2×2 game.

|   | PR    | MR     |
|---|-------|--------|
| p | High  | Medium |
| q | Long  | Medium |

To obtain the Pareto surfaces, a grid search on different values of ε1 and ε2 is conducted. The solution of above two models results in two Pareto surfaces. The network manager and/or the decision maker can pick a desired operational point from the Pareto surfaces.

FIG. 1A is a schematic diagram of a wireless sensor network, according to certain embodiments. The wireless sensor network (WSN) 100 includes wireless sensor nodes (102A-N), a base station 104, and a WSN manager 106. The wireless sensor nodes (102A-N) are configured for monitoring an environment. The wireless sensor nodes (102A-N) wirelessly communicate using any appropriate wireless communication protocol, including but not limited to, various communication protocols based on for example, Institute of Electrical and Electronics Engineers (IEEE) standards, such as IEEE 802.11-compliant (WiFi) communication protocols, IEEE 802.15-compliant communication protocols (for example, such as Bluetooth®, Smart-Grid IEEE 802.15.4g and/or WBAN IEEE 802.15.6g), other appropriate communication standard, and/or variations thereof. The base station 104 receives information about the environment via multiple hop communication from the wireless sensor nodes (102A-N) via a network cloud 103. As used herein, the term "network cloud" can encompass a wired or wireless network of computers, network appliances, servers, routers, switches, gateways, bridges, load balancers, firewalls, processors, modules, or any other suitable network elements, component, element, or object operable to exchange information in a network environment, such as communication system. Moreover, the network elements may include any suitable hardware, software, components, modules, interfaces, or objects that facilitate the operations thereof. The WSN manager 106 is configured to respond to an attack on the wireless sensor network by an adversary to locate critical nodes among the wireless sensor nodes, by adaptively deploying a sequence of different routing mechanisms to the wireless sensor nodes such that location privacy preservation (LPP) is maximized.

The WSN manager 106 is further configured to deploy the sequence of different routing mechanisms at an interval that is not constant, and the intervals are overlapping. The WSN manager 106 is further configured to lengthen a safety period, while ensuring that a Quality of Service (QOS) and energy consumption to perform communication in the network are at a predefined level. The QoS is a transmission latency. The WSN manager 106 is configured to choose among routing mechanisms, deploy each mechanism for a certain period according to a defense strategy, including, but not limited to, Random Walk, Ring Routing, Phantom Base Station, Fake Packet Injection, Multi-path Routing, Data Mule, Hiding Mechanism, Direction Communication. The WSN manager 106 is further configured to achieve the longest possible survival time, while preserving the location privacy of a predetermined node in the network. In several embodiments, the WSN manager 106 may include any type and/or form of suitable hardware, software, or combination of hardware and software to support, enable or provide for the connection and use.

Figure 1B:
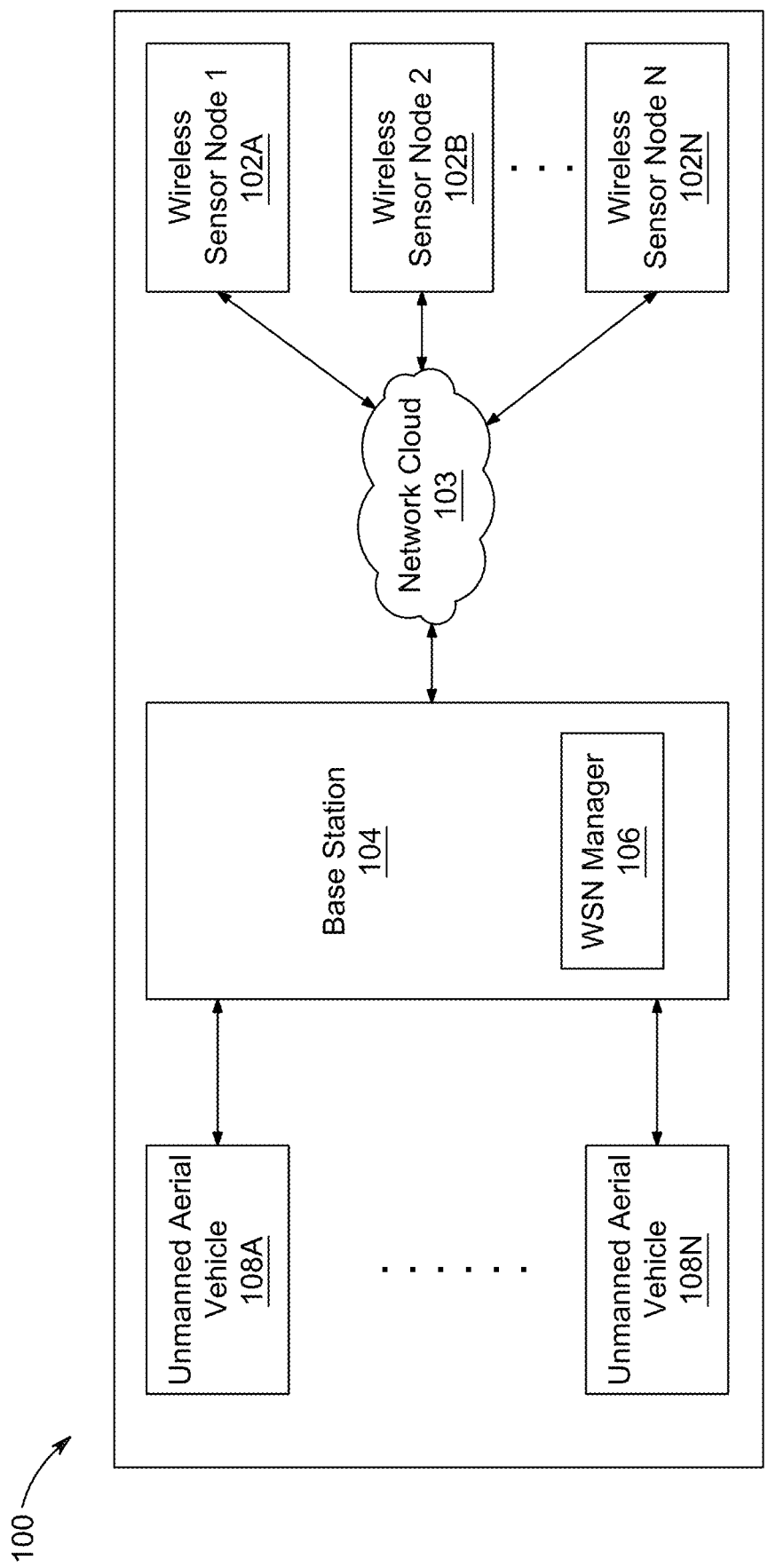
FIG. 1B is a schematic diagram of the wireless sensor network, according to certain embodiments.

FIG. 1B is schematic diagram of the wireless sensor network 100, according to certain exemplary embodiments. The wireless sensor network 100 of FIG. 1B includes Unmanned Aerial Vehicles 108A-N, a base station 104, and a WSN manager 106. The Unmanned Aerial Vehicles 108A-N monitor an environment. The base station 104 receives information about the environment via multiple hop communication. The WSN manager 106 is configured to, given an attack by an adversary, locate critical Unmanned Aerial Vehicles 108A-N among the Unmanned Aerial Vehicles 108A-N to adaptively deploy a sequence of different routing mechanisms to the wireless sensor nodes 102A-N in order to maximize location privacy preservation (LPP). The WSN manager 106 is further configured to deploy the sequence of different routing mechanisms at an interval that is not constant, and the intervals are overlapping. The WSN manager 106 is further configured to lengthen a safety period, while ensuring that a Quality of Service (QOS) and energy consumption to perform communication in the network are at a predefined level. The WSN manager 106 is configured to choose among routing mechanisms and deploy each mechanism for a certain period according to a defense strategy, including Random Walk, Ring Routing, Phantom Base Station, Fake Packet Injection, Multi-path Routing, Data Mule, Hiding Mechanism, Direction Communication.

Figure 1C:
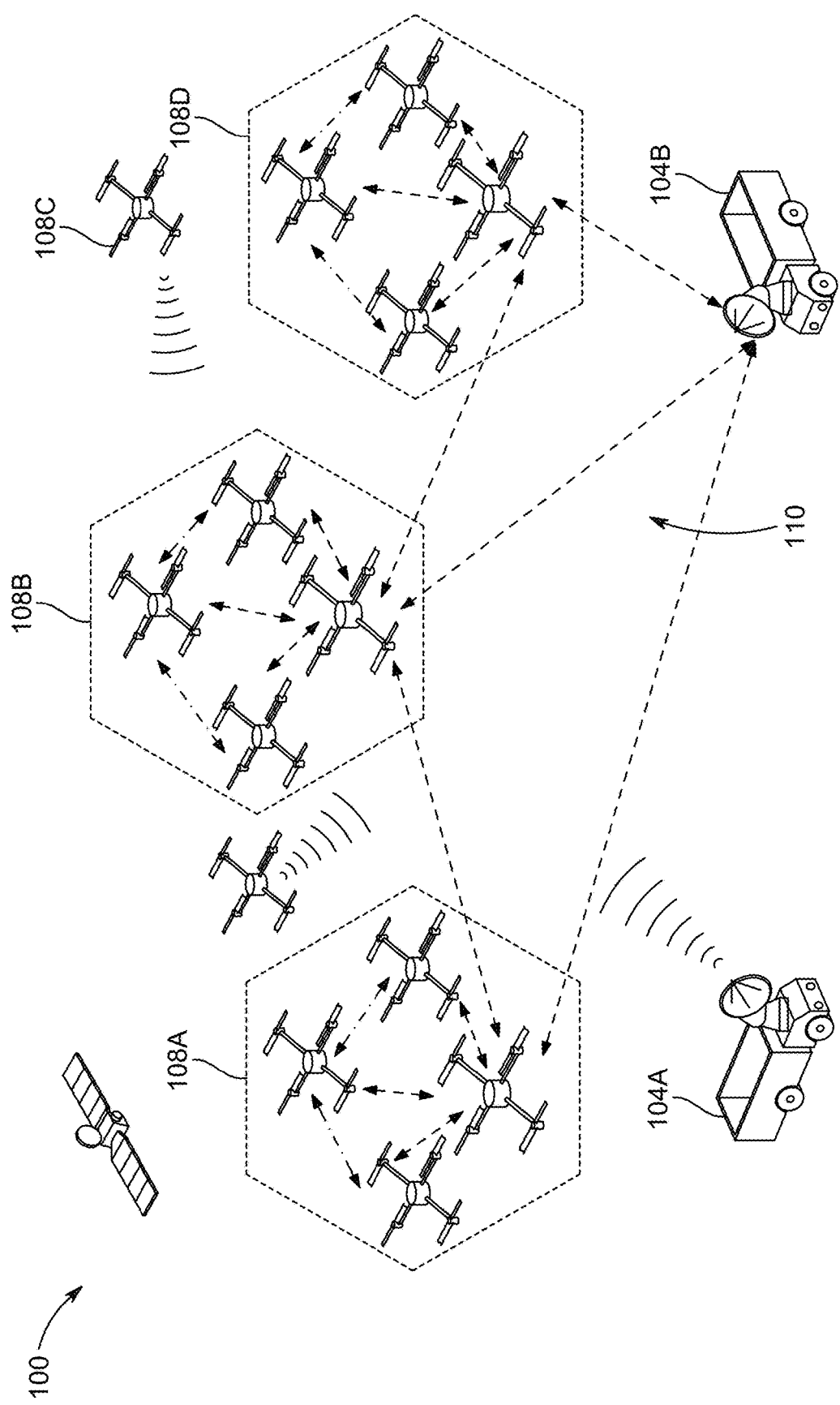
FIG. 1C illustrates an exemplary wireless sensor network, according to certain embodiments.

FIG. 1C illustrates an exemplary wireless sensor network, according to exemplary embodiments. More particularly FIG. 1C depicts a backbone UAV 108A, a mission UAV 108B, a jamming UAV 108C, and a data plane 108D communicatively associated with a jamming base station 104A and a ground station 104B/SDN controller via a control plane 110.

An exemplary Case Study-1 is an example that highlights the notion of mixed strategy, steady state analysis and data estimation. In Case Study-2, synthetic data on an arbitrary 6×6 game is utilized to depict the applicability of the WSN game. In Case Study-3, a non-square game with overlapping intervals, which is related to the real-world scenarios, is presented.

Case Study-1: As an example, consider the case where a defender invokes either Phantom Routing (PR) or Multi-path Routing (MR). On the other hand, the adversary can choose between Traffic Analysis (TA) and Tracing Back (TB). The following payoff matrix (illustrated in Table 1) can be constructed. Furthermore, the average values of energy and latency presented in Table 2 can be attributed to the above routing mechanisms. Clearly, the 2×2 game presented in Table 1 has no pure strategy Nash equilibrium. In fact, this game is similar to the famous Matching Pennies game, which is a cornerstone example for the notion of mixed strategy Nash equilibrium, and the concept of steady state analysis of the games. Indeed, Tables 1 and 2 are not constructed from a comprehensive literature survey, and the studies in the literature may involve other parameters that may result in biased comparisons. Case study 1 establishes the following points:

1) H, p, q can be estimated beforehand from either simulation or emulation study of the actual networks.
2) Mixed strategy Nash equilibrium is strongly applicable to the defender and adversary game.

Case Study-2: The survival time payoff matrix H containing the interval-based normalized survival times (values between (0,1]) are given in Table 3. The normalized values in the range [0.2, 0.4] indicate short (small) survival time, latency or energy consumption, [0.5, 0.7] indicate medium survival time, latency or energy consumption, and [0.8, 1] indicate long survival time, latency or energy consumption. For the routing mechanisms, Table 4 presents the energy p and the latency q values. Suitable units for survival time, energy and latency can be obtained from the network. A discussion on obtaining the above data from an exemplary WSN will be presented at the end of this section. The case study has the following key structure: The defender can change the routing policy from time to time. The defender can invoke any six routing mechanisms, say: R1, R2, . . . . R6. On the other hand, the adversary can change the attacking mechanism from time to time. The adversary can invoke any six attack mechanisms, say: A1, A2, . . . . A6.

Table 3 below illustrates survival time payoffs for the defender in Case Study-2

|    | A1         | A2         | A3         | A4         | A5         | A6         |
|----|------------|------------|------------|------------|------------|------------|
| R1 | [0.5, 0.7] | [0.8, 1]   | [0.5, 0.7] | [0.8, 1]   | [0.2, 0.4] | [0.2, 0.4] |
| R2 | [0.2, 0.4] | [0.5, 0.7] | [0.2, 0.4] | [0.5, 0.7] | [0.8, 1]   | [0.8, 1]   |
| R3 | [0.5, 0.7] | [0.8, 1]   | [0.8, 1]   | [0.2, 0.4] | [0.5, 0.7] | [0.2, 0.4] |
| R4 | [0.8, 1]   | [0.2, 0.4] | [0.2, 0.4] | [0.5, 0.7] | [0.8, 1]   | [0.5, 0.7] |
| R5 | [0.2, 0.4] | [0.5, 0.7] | [0.5, 0.7] | [0.8, 1]   | [0.2, 0.4] | [0.8, 1]   |
| R6 | [0.8, 1]   | [0.2, 0.4] | [0.8, 1]   | [0.2, 0.4] | [0.5, 0.7] | [0.5, 0.7] |

Table 4 below illustrates Energy (p) and Latency (q) for each routing mechanism in Case Study-2:

|   | R1  | R2  | R3  | R4  | R5  | R6  |
|---|-----|-----|-----|-----|-----|-----|
| p | 0.9 | 0.7 | 0.2 | 0.6 | 0.5 | 0.3 |
| q | 0.4 | 0.6 | 0.7 | 0.3 | 0.8 | 0.5 |

The grid for $\varepsilon 1$ is generated by taking 10 equally space intervals of $[0, 0.2*q_{max}]$, $[0, 0.2*q_{max}]$ and $[0, 0.2*q_{max}]$ for solving Formulations (12), (13) and (14) respectively. Similarly, for $\varepsilon 2$, the grid is generated by taking 10 equally space intervals of $[0, 0.2*p_{max}]$, $[0, 0.2*p_{max}]$ and $[0, 0.2*p_{max}]$ for solving Formulations (12), (13) and (14) respectively. In some implementations, the models are solved using GLPK solver.

Figure 2A:
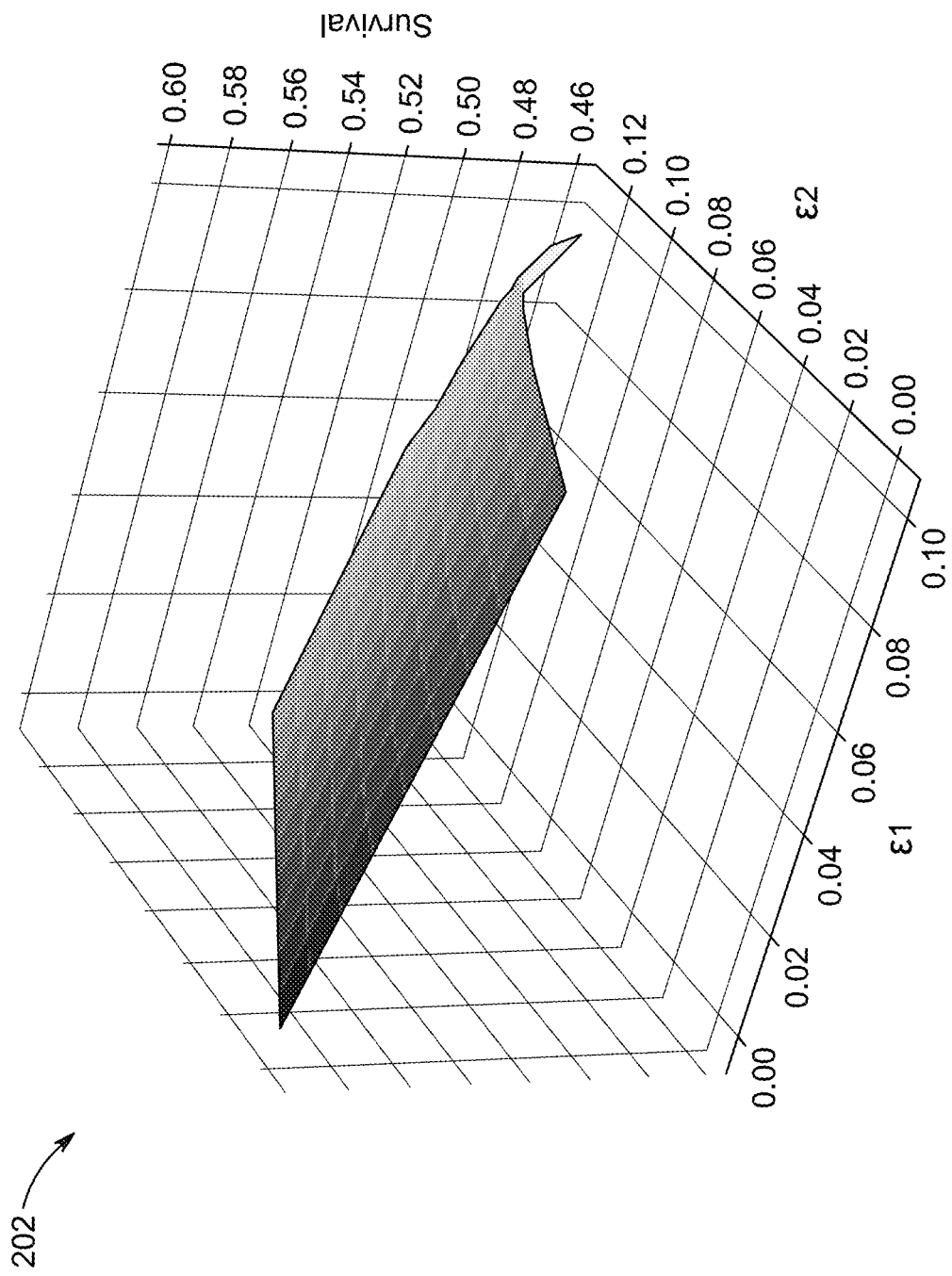
FIG. 2A is an exemplary illustration of Formulation (12)'s Pareto, according to an exemplary scenario.

FIG. 2A is an exemplary illustration of Formulation (12)'s Pareto surface, according to an exemplary scenario. More particularly, FIGS. 2A-2B illustrate a Case Study-3 of Pareto surfaces.

Figure 2B:
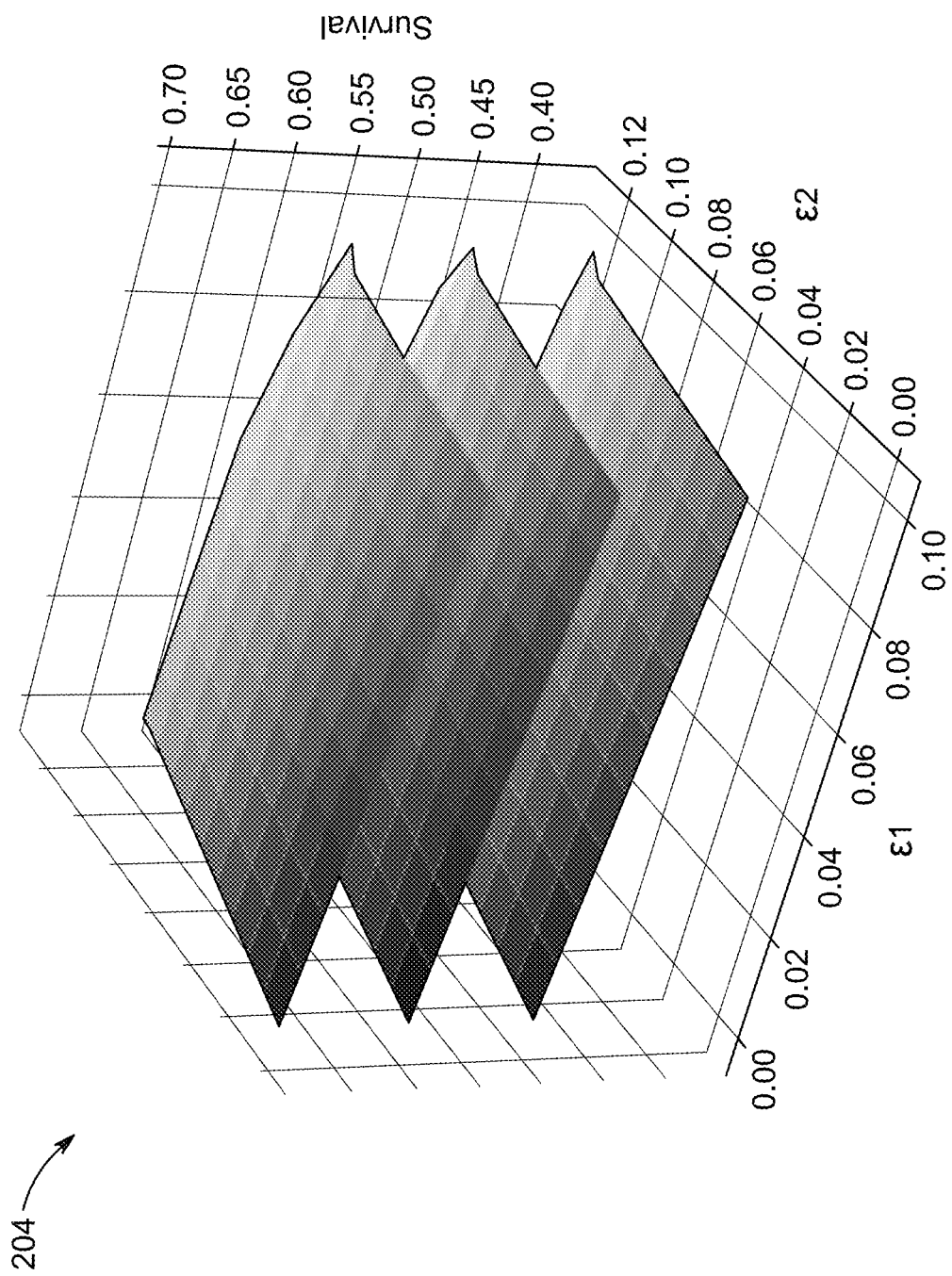
FIG. 2B is an exemplary illustration of Formulations (12), (13) and (14) Pareto surfaces, according to an exemplary scenario.

FIG. 2B is an exemplary illustration of Formulations (12), (13) and (14) Pareto surfaces, according to an exemplary scenario. The Pareto surface obtained after solving Formulation (12) is depicted in FIG. 2A, and the Pareto surfaces obtained after solving Formulations (13) and (14) are illustrated in the top and bottom surfaces in FIG. 2B respectively. As explained above, obtaining the solution for various values of $\varepsilon 1$ and $\varepsilon 2$ results in a Pareto surface, which can be presented to the WSN manager. The network manager and decision makers can then select the operational point from the Pareto surface. Using the Pareto surfaces, a grid search on different values of $\varepsilon 1$ and $\varepsilon 2$ is conducted. The solution of above two models results in two Pareto surfaces. The network manager and/or the decision maker can choose a desired operational point from the Pareto surfaces.

Table 5 displays the results of the case study at $\varepsilon 1=\varepsilon 2=0$, which indicates the minimax game values. From Table 5, it can be concluded that if the defender ignores the latency and energy related objectives, then playing R1, R2 or R6 are equally likely to be the best for LPP. Practically, it means that the network administrator can alternate between R1, R2 or R6 to obtain the longest possible survival time, while preserving the privacy location of the sink node. Other operational points can be extracted from FIG. 2B.

Table 5 below depicts minimax game values (at $\varepsilon 1=\varepsilon 2=0$) of Case Study-2.

|    | Optimistic | Average | Pessimistic |
|----|------------|---------|-------------|
| R1 | 0.333      | 0.333   | 0.333       |
| R2 | 0.333      | 0.333   | 0.333       |
| R3 | 0          | 0       | 0           |
| R4 | 0          | 0       | 0           |
| R5 | 0          | 0       | 0           |
| R6 | 0.333      | 0.333   | 0.333       |

Case Study-3

Case Study-3 is similar to the setup of Case Study-2. The key difference is in the data. The interval widths in Case Study-2 are constant, and the intervals are non-overlapping. In Case Study-3, the interval widths are not constant, and the intervals are overlapping for a given row or column. The data for Case Study-3 is presented as follows: The survival time payoff matrix H containing the interval-based survival times are given in Table 6. Table 4 presents the energy p and the latency q values. The models are solved using the open source GLPK solver.

Table 6 below depicts survival time payoffs for the defender in Case Study-3

|    | A1           | A2           | A3           | A4           | A5           |
|----|--------------|--------------|--------------|--------------|--------------|
| R1 | [0.38, 0.83] | [0.23, 0.63] | [0.33, 0.59] | [0.09, 0.74] | [0.39, 0.99] |
| R2 | [0.36, 0.81] | [0.24, 0.79] | [0.0, 0.78]  | [0.39, 0.74] | [0.25, 0.5]  |
| R3 | [0.16, 0.91] | [0.28, 0.73] | [0.13, 0.73] | [0.0, 0.85]  | [0.16, 0.56] |
| R4 | [0.0, 0.61]  | [0.2, 0.85]  | [0.36, 0.76] | [0.33, 0.59] | [0.0, 0.59]  |
| R5 | [0.09, 0.95] | [0.2, 0.7]   | [0.21, 0.51] | [0.30, 0.8]  | [0.4, 0.8]   |
| R6 | [0.09, 0.55] | [0.01, 0.91] | [0.25, 0.5]  | [0.42, 0.52] | [0.10, 0.7]  |
| R7 | [0.11, 0.96] | [0.02, 0.62] | [0.16, 0.76] | [0.09, 0.75] | [0.38, 0.88] |
| R8 | [0.0, 0.59]  | [0.0, 0.89]  | [0.47, 0.97] | [0.04, 0.5]  | [0.33, 0.58] |

Estimating H, p, q:

In order to implement the technique of the present disclosure, the wireless sensor networks 100 or Internet of Thing Networks (IoTs) should have flexible design such that they can employ different routing protocols alternatively during the network operation. The advancements in network software facilitates the existence of such networks. Other applications of software include but not limit to Routing algorithm optimization in software defined network Wide Area Network (WAN), integrating Multi-path TCP (MPTCP) and Segment Routing (SR) paradigms over SDN/NFV.

Table 7 below shows Energy (p) and Latency (q) for each routing mechanism in Case Study3

|   | R1  | R2  | R3  | R4  | R5  |
|---|-----|-----|-----|-----|-----|
| p | 0.8 | 0.3 | 0.5 | 0.5 | 0.4 |
| q | 0.7 | 0.5 | 0.4 | 0.2 | 1   |

Figure 3A:
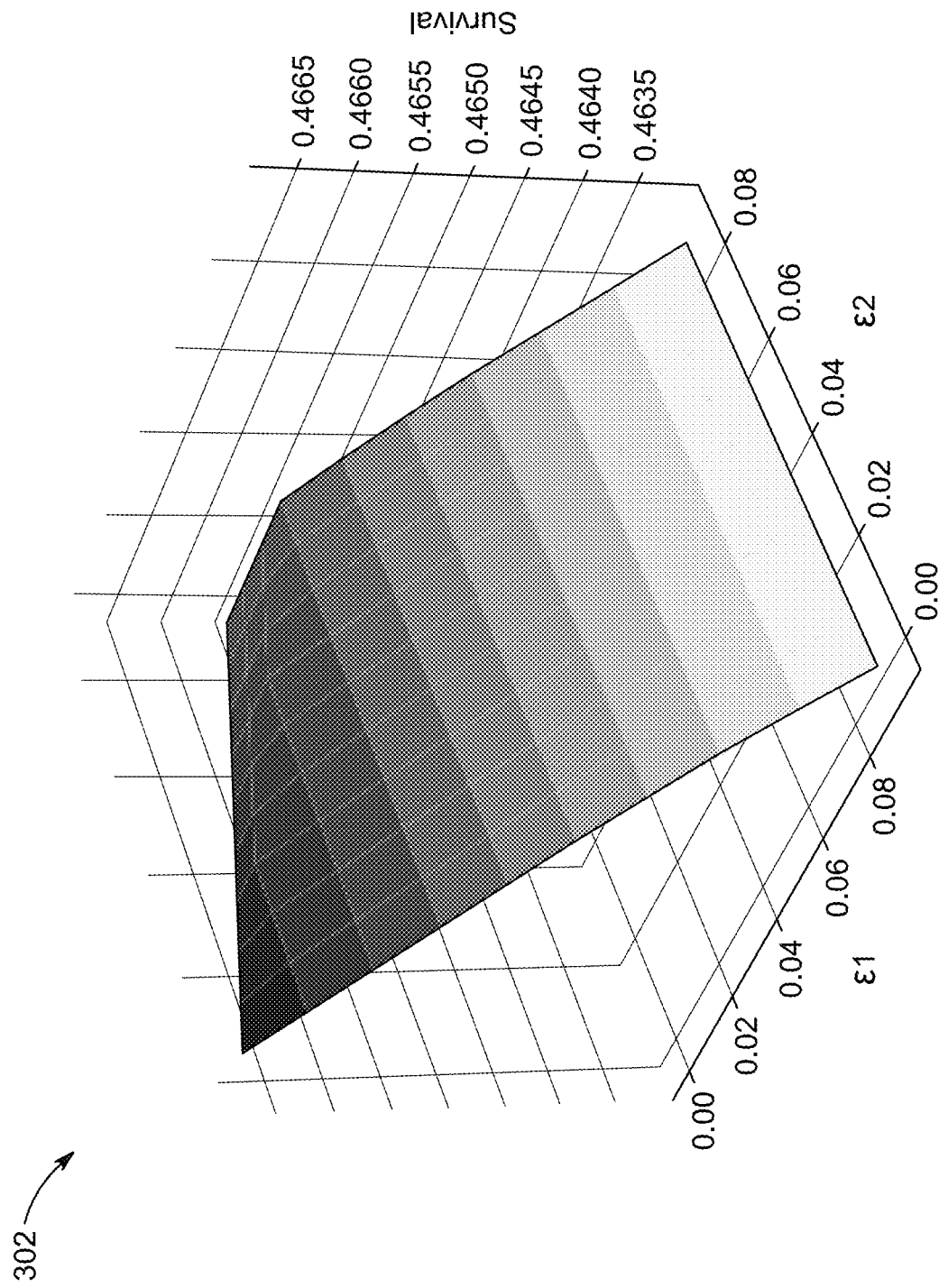
FIG. 3A is an exemplary illustration of Formulation (12)'s Pareto, according to an exemplary scenario.
Figure 3B:
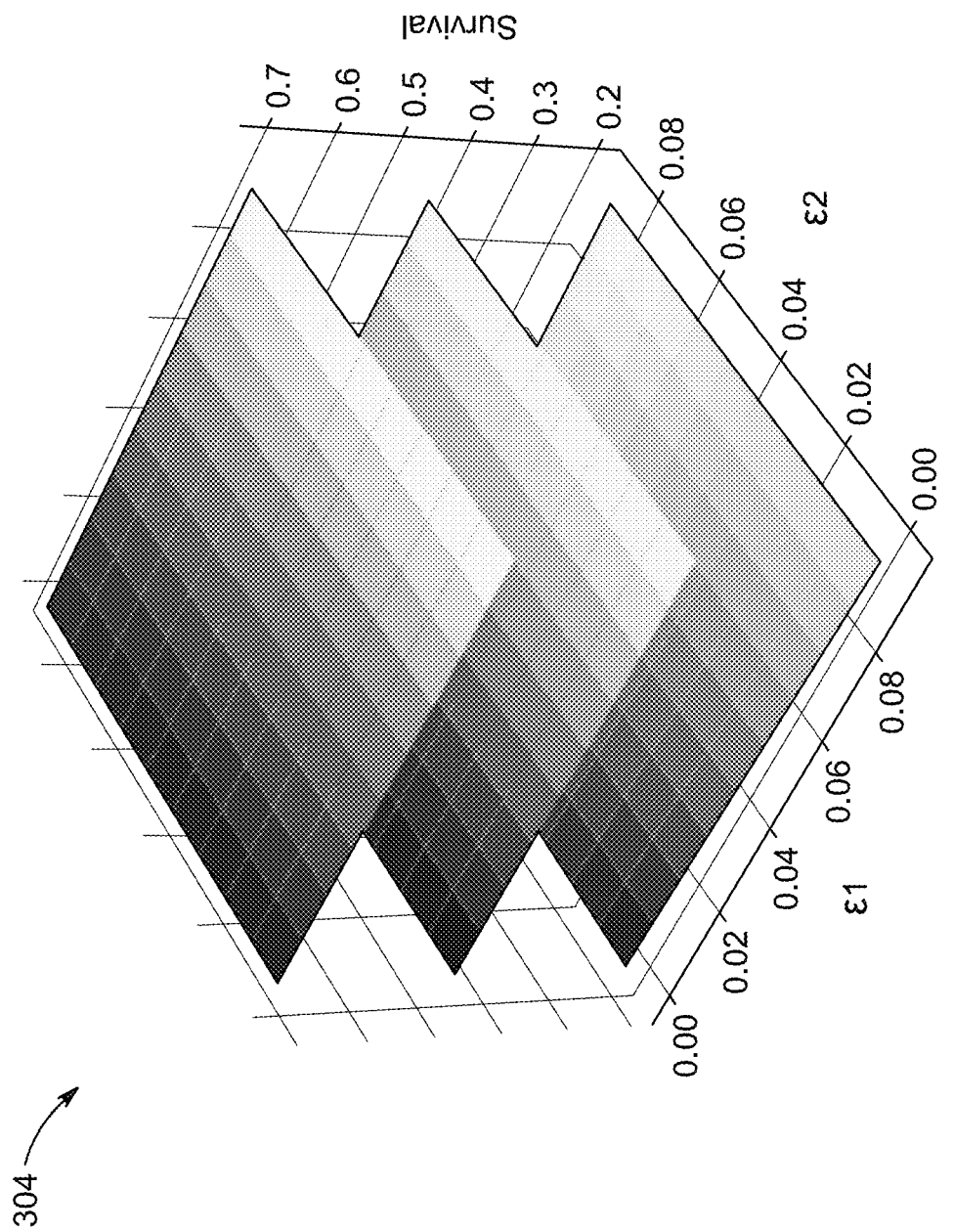
FIG. 3B is an exemplary illustration of Formulations (12), (13) and (14) Pareto surfaces, according to an exemplary scenario.

FIG. 3A is an exemplary illustration of Formulation (12)'s Pareto surface, according to an exemplary scenario. FIG. 3B is an exemplary illustration of Formulations (12), (13) and (14) Pareto surfaces, according to an exemplary scenario. The Pareto surface obtained after solving Formulation (12) is depicted in FIG. 3A, and the Pareto surfaces obtained after solving Formulations (13) and (14) are illustrated in top and bottom surfaces in FIG. 3B, respectively. Table 8 below shows Minimax game values for Case Study-3 (at $\varepsilon 1=\varepsilon 2=0$)

|    | Optimistic | Average | Pessimistic |
|----|-----------|---------|-------------|
| R1 | 0         | 0.227   | 0.152       |
| R2 | 0         | 0       | 0.351       |
| R3 | 0.263     | 0       | 0           |
| R4 | 0         | 0       | 0.299       |
| R5 | 0.13      | 0.196   | 0.12        |
| R6 | 0.094     | 0       | 0.074       |
| R7 | 0.369     | 0.577   | 0.003       |
| R8 | 0.144     | 0       | 0           |

Table 8 displays the results of the case study at $\varepsilon1=\varepsilon2=0$, which indicates the minimax game values. From Table 8, it can be concluded that if the defender ignores the latency and the energy related objectives, then: under optimistic circumstances playing R3, R5, R6, R7 or R8 with the given probabilities in Table 8 is best for LPP. In practice, this could mean that R7 is deployed 36.9% of the time, R3 is deployed 26.3% of the time, R8 is deployed 14.4% of the time, and so on. Similarly, under pessimistic circumstances, playing R1, R2, R4, R5, R6, or R7 with the given probabilities in Table 8 is best for LPP.

Once such networks are established, H, p, q can be easily obtained either by developing a simulation model or determining empirical data from emulated networks. The simulation and emulation models should have the ability to estimate the survival times, latency, and energy for a pair of routing and attack mechanisms. Thus, for a given network under consideration, the data H, p, q are preferably estimated via a simulation model a priori by the WSN manager or the decision maker.

The present disclosure is directed towards designing a multi-routing wireless sensor network. This approach is effective because the adversary can choose and/or change an attacking mechanism at any given time during the time horizon. Thus, the WSN manager preferably has the ability to choose/alternate among different routing protocols for the longevity of the network's LPP. Furthermore, the game theoretic model provides the WSN manager with a guide on the proportion of time dedicated to each routing protocol, under optimistic, average and pessimistic circumstances. The usage of multiple routing protocols with suggested time proportions is very effective on Location Privacy Preservation (LPP).

FIG. 4 depicts a flowchart 400 of a method for routing in a wireless sensor network (WSN), according to some embodiments. The wireless sensor network includes wireless sensor nodes for monitoring an environment and a base station having a WSN manager to which information about the monitored environment is sent via multiple hop communication.

In a brief overview of the implementation of the flowchart 400, at step 402, an attack to locate critical nodes, among wireless senso nodes, by an adversary is responded to by adaptively deploying a sequence of different routing mechanisms, by the WSN manager, to the wireless sensor nodes such that location privacy preservation (LPP) is maximized.

In an implementation, an interval between the sequence of different routing mechanisms is not constant and the intervals are overlapping.

In an implementation, wherein the adaptively deploying, by the WSN manager, is performed as a two-player zero-sum game, where an objective of the WSN manager is to maximize a minimum expected payoff, and an objective of the adversary is to minimize the maximum expected loss.

In an implementation, the expected payoff in the two-player zero-sum game is uncertain, the uncertain payoff is a bounded interval including a lower bound and an upper bound, the bounded interval results in a pair of solutions to the two-player zero-sum game, and the WSN manager picks a desired solution from the pair of solutions.

In an implementation, the adaptively deploying, by the WSN manager, includes lengthening a safety period, while ensuring that Quality of Service (QOS) and energy consumption of the communication in the network are at a predefined level.

In an implementation, the safety period, QoS and energy consumption are estimated, by the WSN manager, using a simulation model.

In an implementation, the QoS is a transmission latency.

In an implementation, the method includes choosing, by the WSN manager, among routing mechanisms, each for a certain period according to a defense strategy, the routing mechanisms including random walk, ring routing, phantom base station, fake packet injection, multi-path routing, data mule, hiding mechanism, and direction communication.

In an implementation, adaptively deploying, by the WSN manager, is based on an object to achieve a longest possible survival time, while preserving the location privacy of a predetermined wireless sensor node in the network.

In an implementation, the wireless sensor network is a network of Unmanned Aerial Vehicles.

Figure 5:
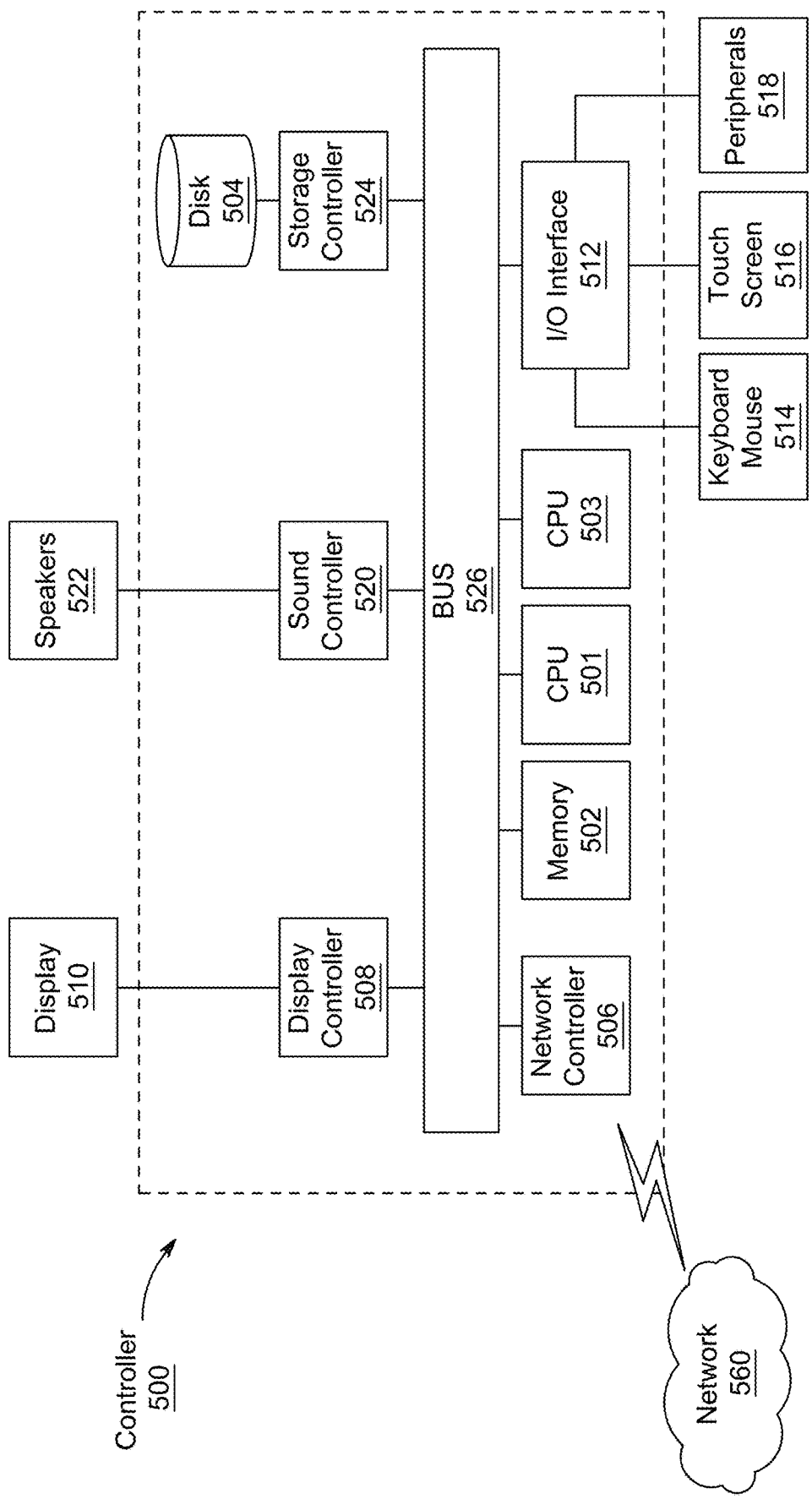
FIG. 5 illustrates a hardware description of the computing environment of wireless sensor networks of FIGS. 1A-1B, according to certain embodiments.

Next, further details of the hardware description of the computing environment of wireless sensor network (WSN) 100 of FIGS. 1A and 1B according to exemplary embodiments is described with reference to FIG. 5. In FIG. 5, a controller 500 is described is representative of the system 100 of FIG. 1 in which the controller is a computing device which includes a CPU 01 which performs the processes described above/below. The process data and instructions may be stored in memory 502. These processes and instructions may also be stored on a storage medium disk 504 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 501, 503 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or maybe other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN sub-networks. The network 560 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computing device further includes a display controller 508, such as a NVIDIA GeForce GTX® or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an Officejet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
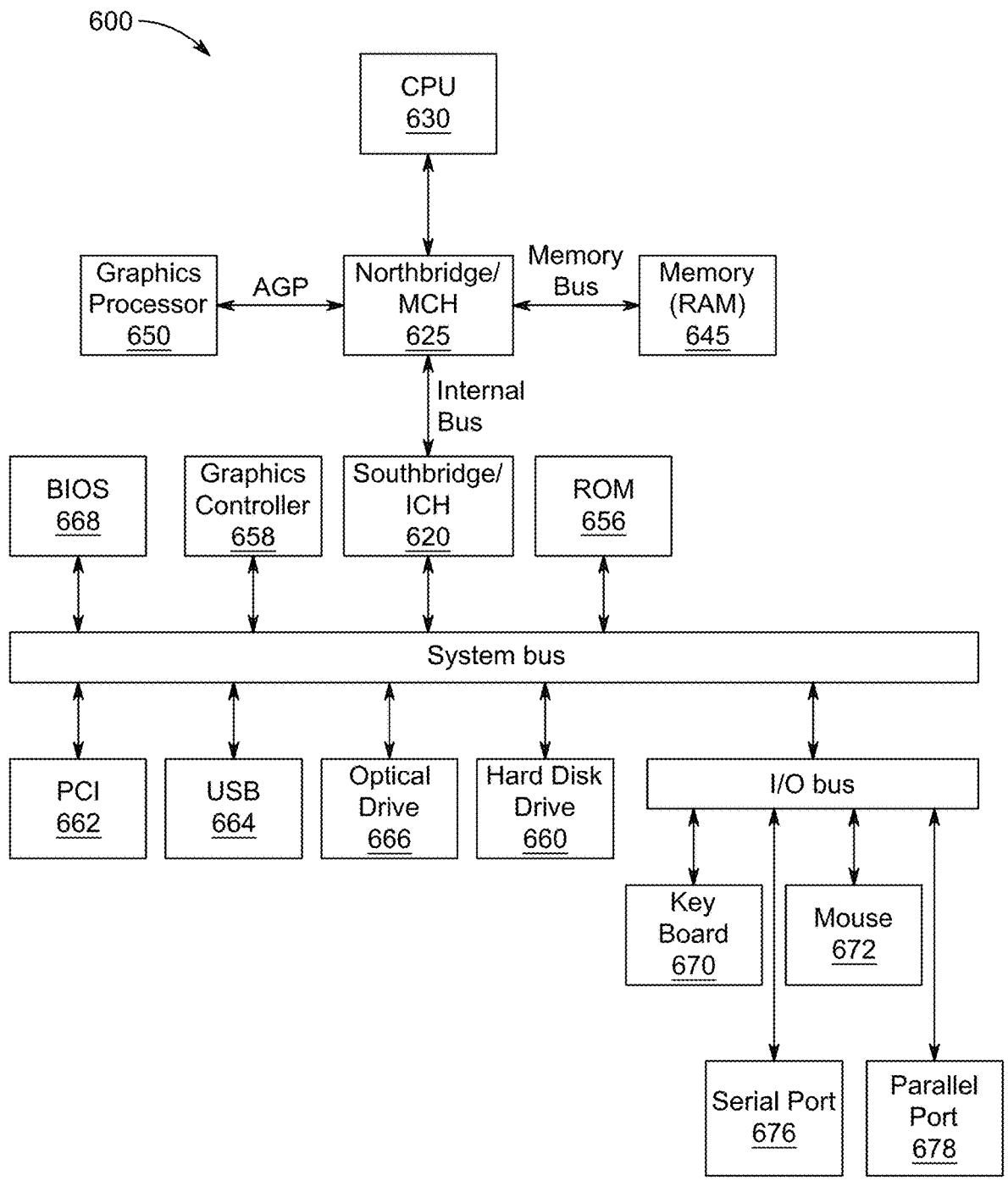
FIG. 6 is a schematic diagram of a data processing system, according to certain embodiments, for performing the functions of the exemplary embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located. In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The network may be a private network, such as a LAN or WAN, or maybe a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of routing in a wireless sensor network (WSN), wherein the wireless sensor network includes wireless sensor nodes for monitoring an environment and a base station having a WSN manager to which information about the environment is sent from the wireless sensor nodes via multiple hop communication, the method comprising:
    responding to an attack on the wireless sensor network by an adversary to locate critical nodes among the wireless sensor nodes by adaptively deploying a sequence of different routing mechanisms, by the WSN manager, to the wireless sensor nodes such that location privacy preservation (LPP) is protected by preventing detection of location of the critical nodes, and
    wherein during the adaptively deploying, the different routing mechanisms are adaptively deployed in sequence, wherein interval value widths for different routing mechanisms are not constant and wherein the intervals have overlapping values.

2. The method of claim 1, wherein the adaptively deploying, by the WSN manager, is performed as a two-player zero-sum game, where an objective of the WSN manager is to maximize a minimum expected payoff, and an objective of the adversary is to minimize a maximum expected loss.

3. The method of claim 2, wherein the expected payoff in the two-player zero-sum game is uncertain,
wherein the uncertain expected payoff is a bounded interval including a lower bound and an upper bound,
wherein the bounded interval results in a pair of solutions to the two-player zero-sum game,
wherein the WSN manager picks a desired solution from the pair of solutions.

4. The method of claim 1, wherein the adaptively deploying, by the WSN manager, includes lengthening a safety period, while maintaining a Quality of Service (QOS) and an energy consumption of the multiple hop communication in the wireless sensor network at a predefined level.

5. The method of claim 4, wherein the safety period, the QoS and the energy consumption are estimated, by the WSN manager, using a simulation model.

6. The method of claim 4, wherein the QoS is a transmission latency.

7. The method of claim 1, further comprising:
choosing, by the WSN manager, among routing mechanisms, each for a certain period according to a defense strategy, the routing mechanisms including a combination of routing mechanisms selected from the group consisting of Random Walk, Ring Routing, Phantom Base Station, Fake Packet Injection, Multi-path Routing, Data Mule, Hiding Mechanism, and Direction Communication.

8. The method of claim 1, wherein the adaptively deploying, by the WSN manager, is based on an object to achieve a longest possible survival time, while preserving the location privacy of a predetermined wireless sensor node in the network.

9. The method of claim 1, wherein the wireless sensor nodes are Unmanned Aerial Vehicles.

10. A wireless sensor network (WSN), comprising:
wireless sensor nodes for monitoring an environment;
a base station to which information about the environment is sent via multiple hop communication; and
a WSN manager having circuitry configured to
respond to an attack on the wireless sensor network by an adversary to locate critical nodes among the wireless sensor nodes, by adaptively deploy a sequence of different routing mechanisms to the wireless sensor nodes such that location privacy preservation (LPP) is protected by preventing detection of location of the critical nodes, and
wherein the WSN manager is further configured to adaptively deploy the different routing mechanisms in sequence, wherein interval value widths are not constant and the interval values are overlapping.

11. The wireless sensor network of claim 10, wherein the WSN manager is further configured to lengthen a safety period, while maintaining a Quality of Service (QOS) and an energy consumption of the multiple hop communication in the wireless sensor network at a predefined level.

12. The wireless sensor network of claim 11, wherein the QoS is a transmission latency.

13. The wireless sensor network of claim 10, wherein the WSN manager is configured to choose among routing mechanisms, deploy each mechanism for a certain period according to a defense strategy, including a combination of routing mechanisms selected from the group consisting of
Random Walk, Ring Routing, Phantom Base Station, Fake Packet Injection, Multi-path Routing, Data Mule, Hiding Mechanism, and Direction Communication.

14. The wireless sensor network of claim 10, wherein the WSN manager is further configured to achieve a longest possible survival time, while preserving the location privacy of a predetermined node in the network.

15. A wireless sensor network (WSN), comprising:
Unmanned Aerial Vehicles for monitoring an environment;
a base station to which information about the environment is sent via multiple hop communication; and
a WSN manager having circuitry configured to
given an attack by an adversary to locate critical Unmanned Aerial Vehicles among the Unmanned Aerial Vehicles,
adaptively deploy a sequence of different routing mechanisms to the Unmanned Aerial Vehicles in order to protect location privacy preservation (LPP) by preventing detection of location of the critical Unmanned Aerial Vehicles,
wherein the WSN manager is further configured to deploy the sequence of different routing mechanisms at an interval that is not constant and the intervals are overlapping.

16. The wireless sensor network of claim 15, wherein the WSN manager is further configured to lengthen a safety period, while maintaining a Quality of Service (QOS) and an energy consumption of the multiple hop communication in the wireless sensor network at a predefined level.

17. The wireless sensor network of claim 15, wherein the WSN manager is configured to choose among routing mechanisms, and deploy each mechanism for a certain period according to a defense strategy, including a combination of routing mechanisms selected from the group consisting of
Random Walk, Ring Routing, Phantom Base Station, Fake Packet Injection, Multi-path Routing, Data Mule, Hiding Mechanism, and Direction Communication.

* * * * *